United States Patent [19]

Haberman

[11] Patent Number: 5,147,997
[45] Date of Patent: Sep. 15, 1992

[54] STAND-OFF CUP FOR TORCH

[75] Inventor: Randy G. Haberman, Burbank, Calif.

[73] Assignee: Delaware Capital Formation, Inc., Burbank, Calif.

[21] Appl. No.: 718,725

[22] Filed: Jun. 21, 1991

[51] Int. Cl.⁵ .............................................. B23K 9/00
[52] U.S. Cl. ........................... 219/121.5; 219/121.48; 219/121.51; 219/75
[58] Field of Search ........... 219/121.5, 121.52, 121.39, 219/121.44, 74, 75, 121.48, 121.54

[56] References Cited

U.S. PATENT DOCUMENTS

| | | | |
|---|---|---|---|
| 3,872,279 | 3/1975 | Fairbairn | 219/121.5 |
| 4,792,657 | 12/1988 | Conley | 219/121.39 |
| 4,891,489 | 1/1990 | Bollinger et al. | 219/121.5 |
| 4,924,060 | 5/1990 | Delzenne | 219/121.5 |
| 4,940,879 | 7/1990 | De-Swaan | 219/121.39 |
| 5,039,837 | 8/1991 | Nourbakhsh et al. | 219/121.5 |

Primary Examiner—Mark H. Paschall
Attorney, Agent, or Firm—Jessup, Beecher and Slehofer

[57] ABSTRACT

A cutting torch is provided circumjacent its tip with a stand-off cup which maintains a fixed distance between the torch orifice and the work piece. The distal end of the cup has a series of notches or windows which allow the operator to see the cutting arc and also permit escape of arc spatter. Between the notches are posts or castellations, at the distal end of which is a ring that maintains constant spacing between the cutting arc and a template, as the torch is guided around the edge of the template.

11 Claims, 1 Drawing Sheet

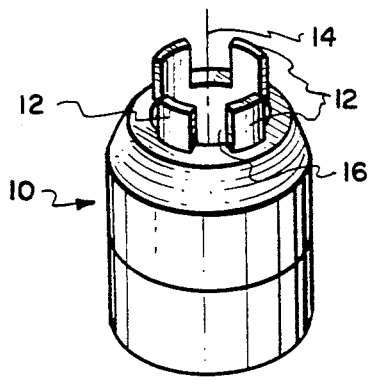
Fig. 1. PRIOR ART
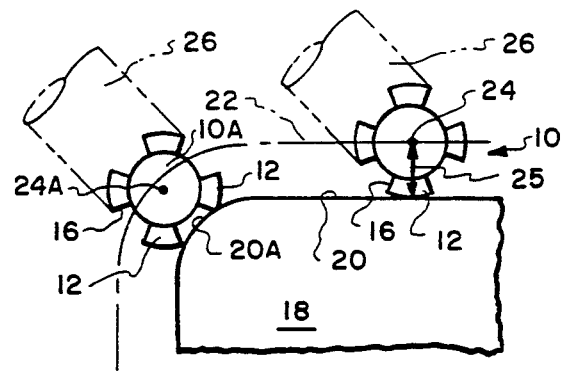
Fig. 2. PRIOR ART
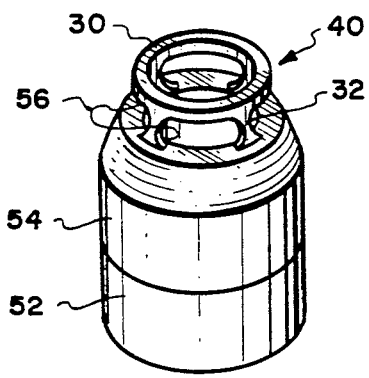
Fig. 3.
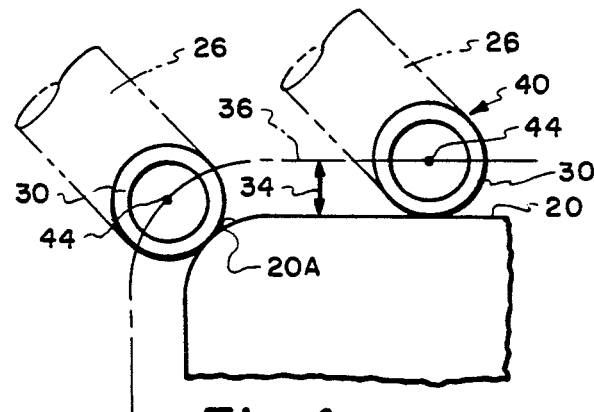
Fig. 4.
Fig. 5.
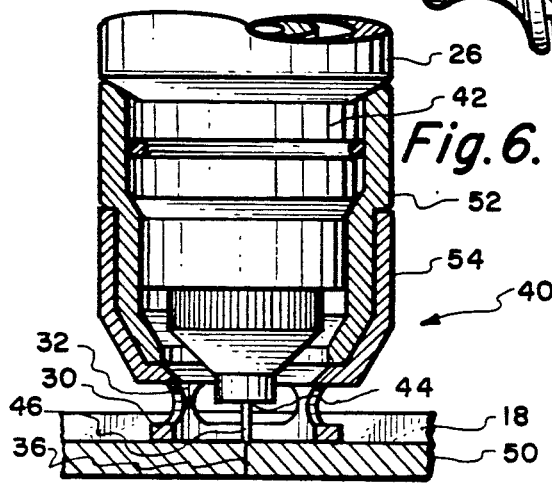
Fig. 6.
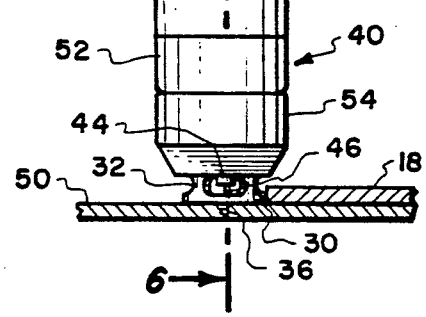

STAND-OFF CUP FOR TORCH

This invention relates to a stand-off cup for a plasma torch, which maintains the torch orifice at a fixed distance from the work piece. When using a plasma torch, for example when cutting a work piece, it is desirable to maintain a uniform arc between the tip and the work piece, as the torch is moved along the surface of the work piece. Such uniformity is attained by use of a stand-off cup placed over and around the tip, the distal edge of which rides along the surface of the work piece. The cup thus functions as a spacer means insuring a constant length torch arc between the tip of the torch and the work piece. It is customary to provide the distal end of the cup with notches or gaps around the periphery so that the operator may see the torch arc between the tip and the work piece. These notches, or windows, also provide a passage for escape of torch air and spatter, allowing spatter to escape from the region of the cut.

When the torch is used in conjunction with a template, castellations which form the spacer means between the tip and the work piece are slid along the edge of the template in order to allow the template to form a guide for the cut being made by the torch. To maintain uniform spacing between the template and the projected cutting line it is necessary that the outer edge of a castellation always be in contact with the edge of the template. This requires the operator to hold the torch handle at a constant angle with respect to the edge of the template, with consequent awkwardness when a curve in the template is encountered. It is easier for the operator to hold the torch handle substantially constant with respect to the template body and not require the handle to be turned tortuously with each curve in the edge of the template. In such an operation, however, when a curve in the edge of the template is encountered, the edge of the template no longer bears against the outer edge of the castellation, but becomes the chord of an arc between adjacent castellations, where it spans a window intermediate adjacent castellations. In this event the cutting line of the torch is no longer a constant, fixed distance from the template edge. Thus the template no longer is a faithful guide for the cutting line.

SUMMARY OF THE INVENTION

In accordance with the present invention the stand-off cup castellations are provided at their distal end with a ring which bears against the edge of the template. Thus no matter what the angle of the torch handle with respect to the template edge, a constant distance is maintained between the plasma arc and the edge of the template.

BRIEF DESCRIPTION OF THE DRAWINGS

In the drawings, FIG. 1 is a perspective view of a stand-off cup of the prior art.

FIG. 2 is a somewhat schematic view showing the shortcomings in the prior art when the torch is manipulated around a curve or corner of a template.

FIG. 3 is a perspective view of a stand-off cup embodying the present invention.

FIG. 4 is a somewhat schematic view of the present invention showing how the ring of the present invention maintains a constant spacing between the edge of the template and the cutting line of the torch.

FIG. 5 is an elevational view of a cutting torch with the cup of the present invention installed and bearing against a template while the torch arc makes a cut in a work piece.

FIG. 6 is an enlarged, fragmentary section of the tip of the torch shown in FIG. 5.

DETAILED DESCRIPTION OF THE DRAWINGS

FIG. 1 is an exemplary form of prior art showing a stand-off cup body 10 which fits over a torch tip. The forward or anterior end of the body is provided with a plurality of castellations or spacer members 12 which are typically disposed on a circle circumjacent the central axis 14 of the cup body 10. The cutting arc between the torch tip and the work piece lies on the axis 14. Between adjacent castellations 12 is a window or notch 16 which allows the operator to view the torch arc and also permits torch air and spatter to escape from the region of the cut.

As shown in FIG. 2 the torch is moved around the edge of a template 18 with the stand-off cup bearing against the edge 20 of the template to provide constant spacing between the template edge 20 and the cut line 22. The plasma arc (represented by the dot 24) is thus maintained at a constant distance 25 from the template edge 20.

Typically, as the operator moves the cutting torch around the template 18, the handle 26 of the cutting torch will be held at a substantially constant angle with respect to the template 18, and will not be rotated, because of the awkwardness of such an operation. Thus, when the torch, and specifically the stand-off cup 10, reaches the position shown at 10A at the rounded corner 20A, the castellations 12 will bracket the curve at 20A. The center 24A, that is the position of the cutting arc, will be closer to the template edge than when the stand-off cup was in the former position shown at 24. Thus, the cutting line 22 will have a flatter corner than the actual template 28; this will depend on the particular attitude of the torch handle 26. This aberration between the cutting line 22 and the template edge 20 will either have to be touched up by subsequent cutting or else the template edge 20 would have to be deliberately altered to accommodate the deviation in the position of the stand-off cup shown at 10 from the position shown at 10A.

It is the purpose of the present invention to obviate this aberration by providing a ring 30 at the distal end of the castellations 32, as shown in FIG. 3. The resulting traverse of the torch and stand-off cup around the template 18 is a constant distance 34 (FIG. 4) between the template edge 20 and the cutting line 36, not only in the straight portion 20 of the template but also around the curve 20A.

The relationship between the torch handle 26 and the stand-off cup 40 of the present invention is shown in FIG. 5. The distal or working end of the torch consists of a tip 42 terminating in an arc orifice 44, from which emerges the plasma arc 46. Arc 46 forms the cut 36 in the work piece 50 as the torch is moved around the edge of the template 18.

The stand-off cup of the present invention in the embodiment shown in FIG. 3 consists of a posterior portion 52 which is press fitted over and around the torch tip 42, and an anterior portion 54, on the distal end of which are formed four castellations 32, terminating in the interconnecting ring 30. The posterior portion 52 of the cup 40 is preferably formed of a ceramic or other insulating material. For strength the anterior portion 54 is formed of metal; the parts 54, 32, and 30 may be formed integrally.

As noted with respect to FIG. 4 the handle 26 of the torch may be held at any attitude with respect to the template 18, and the cutting line 36 will still be formed at a constant and predictable distance 34 away from the edge 20/20A of the template 18.

Because there is no danger of the template edge 20A (FIG. 2) entering into the window region 16 of the cup, between castellations 12, the windows in the present invention may be made quite large, as shown at 56, thereby providing good visibility and maximum escape passage for the air and cutting products from the interior of the cup.

While the cup 40 may be made of one piece insulating material if desired, it is presently preferred to make the anterior portion 54 of metal because of the added strength.

The stand-off distance between the torch orifice 44 and the surface of the work piece 50, i.e. the length of the cutting arc 46, is determined by a number of variables, including inter alia the amperage of the cutting arc, the cutting speed, the type and thickness of the work piece 50, and the tip orifice size.

What is claimed is:

1. Stand-off cup for torch comprising: a cup-shaped body having
   a posterior portion with means for securely fitting the body over a torch tip,
   an anterior portion terminating in a series of castellations; and
   a circular ring at the distal end of said castellations;
   whereby the torch tip may be guided around the edge of a template with said ring touching the template and maintaining even spacing of the tip from the template.

2. Cup in accordance with claim 1 wherein said posterior portion is substantially cylindrical, and
   said castellations reside on a castellation circle coaxial with the axis of said ring.

3. Cup in accordance with claim 1 wherein said posterior portion is of insulating material, and
   said anterior portion is of metal.

4. Stand-off cup for torch comprising:
   a cup body having means for securely fitting the body over a torch tip;
   circular ring means coaxial with the axis of the torch tip; and
   spacer means connecting said ring and said cup means;
   whereby the torch tip may be guided around the edge of a template with said ring touching the template and maintaining even spacing of the tip from the template.

5. Cup in accordance with claim 4, wherein:
   said spacer means comprises a plurality of posts extending between said ring means and said cup means, with windows therebetween to provide air passage and visual access to the tip flame.

6. A cutting torch having a tip, and,
   a handle projecting from said tip at an angle therefrom, adapted to be grasped by an operator so as to guide the tip along a desired path,
   a stand-off cup circumjacent said tip,
   said cup comprising: a cup body having a posterior portion fitted over said tip,
   an anterior portion having a series of castellations, and
   a ring at the distal end of said castellations,
   whereby the torch tip may be guided around the edge of a template with said ring touching the template and maintaining even spacing of the tip from the template.

7. Torch in accordance with claim 6 wherein said posterior portion is substantially cylindrical, and
   said castellations reside on a castellation circle coaxial with the axis of said posterior portion.

8. Cup in accordance with claim 7 wherein said ring is circular with the center thereof disposed on the axis of said castellation circle.

9. Cup in accordance with claim 6 wherein said posterior portion is of insulating material, and
   said anterior portion is of metal.

Add the following claims:

10. A cutting torch having a tip,
    a handle projecting from said tip at an angle therefrom, adapted to be grasped by an operator so as to guide the tip along a desired path,
    cup means fitted over said tip,
    circular ring means coaxial with the axis of the torch tip, and
    spacer means connecting said ring and said cup means,
    whereby the torch tip may be guided around the edge of a template with said ring touching the template and maintaining even spacing of the tip from the template.

11. Cutting torch in accordance with claim 10, wherein:
    said spacer means comprises a plurality of posts extending between said ring means and said cup means, with windows therebetween to provide air passage and visual access to the tip flame.

* * * * *